US008275247B2

(12) United States Patent
Park

(10) Patent No.: US 8,275,247 B2
(45) Date of Patent: Sep. 25, 2012

(54) METHOD AND APPARATUS FOR NORMAL REVERSE PLAYBACK

(75) Inventor: Chang-dae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1363 days.

(21) Appl. No.: 11/933,629

(22) Filed: Nov. 1, 2007

(65) Prior Publication Data

US 2008/0247729 A1 Oct. 9, 2008

(30) Foreign Application Priority Data

Apr. 6, 2007 (KR) .................. 10-2007-0034416

(51) Int. Cl.
*H04N 5/783* (2006.01)
(52) U.S. Cl. ...................................... 386/344
(58) Field of Classification Search .............. 386/344
See application file for complete search history.

(56) References Cited

U.S. PATENT DOCUMENTS 6,009,231 A * 12/1999 Aoki et al. ............... 386/353
6,879,770 B1 4/2005 Van Asten et al.
2005/0257239 A1 * 11/2005 Evans et al. ............... 725/88
2007/0058928 A1 * 3/2007 Naito et al. ............... 386/68
2008/0063081 A1 * 3/2008 Iguchi et al. ............ 375/240.23

FOREIGN PATENT DOCUMENTS

JP       2003-009157 A    1/2003
KR    1020010101566 A    11/2001

OTHER PUBLICATIONS

Office Action issued Jul. 11, 2011 in counterpart Korean Patent Application No. 1020070034416.

* cited by examiner

*Primary Examiner* — Thai Tran
*Assistant Examiner* — William Tran
(74) *Attorney, Agent, or Firm* — Sughrue Mion, PLLC

(57) ABSTRACT

Provided are a method and apparatus for normal reverse playback of GOPs of a bitstream stored in a storage medium from an $X^{th}$ GOP. The apparatus includes an MPEG decoder which reads a first bitstream corresponding to the $X^{th}$ GOP and an $(X-1)^{th}$ GOP from the storage medium and which decodes pictures of the $X^{th}$ GOP and reference pictures of the $(X-1)^{th}$ GOP using the read bitstream, a frame buffer which stores the pictures decoded by the MPEG decoder, and a display block which displays the decoded pictures stored in the frame buffer, wherein during the normal reverse playback, the apparatus displays all the decoded pictures only once, and each display time of the decoded pictures displayed only once is the same. Accordingly, the apparatus can perform a linear search even during the normal reverse playback.

20 Claims, 8 Drawing Sheets

(a) DISPLAY : P8'  GOP(X-1)  | | I2" | | P8' | | P5' |   | I2' |
    DECODING : B7'                                         | B7' |   | B0 |

(b) DISPLAY : B7'  GOP(X-1)  | | I2" | | P8' | | P5' |   | I2' |
    DECODING : B6'                                         | B7' |   | B6' |

(c) DISPLAY : B6'  GOP(X-2)  | | I2" | | P5" | | P5' |   | I2' |
    DECODING : P5"                                         | B7' |   | B6' |

(d) DISPLAY : P5'  GOP(X-1)  | | I2" | | P5" | | P5' |   | I2' |
    DECODING : B4'                                         | B4' |   | B6' |

(e) DISPLAY : B4'  GOP(X-1)  | | I2" | | P5" | | P5' |   | I2' |
    DECODING : B3'                                         | B4' |   | B3' |

(f) DISPLAY : B3'  GOP(X-2)  | | I2" | | P5" | | P8" |   | I2' |
    DECODING : P8"                                         | B4' |   | B3' |

(g) DISPLAY : I2'  GOP(X-1)  | | I2" | | P5" | | P8" |   | I2' |
    DECODING : B1'                                         | B1' |   | B3' |

(h) DISPLAY : B1'  GOP(X-1)  | | I2" | | P5" | | P8" |   | I2' |
    DECODING : B0'                                         | B1' |   | B0' |

(i) DISPLAY : B0'  GOP(X-3)  | | I2'" | | P5" | | P8" |   | I2' |
    DECODING : I2'"                                        | B1' |   | B0' |

METHOD AND APPARATUS FOR NORMAL REVERSE PLAYBACK

CROSS-REFERENCE TO RELATED PATENT APPLICATION

This application claims priority from Korean Patent Application No. 10-2007-0034416, filed on Apr. 6, 2007, in the Korean Intellectual Property Office, the disclosure of which is incorporated herein in its entirety by reference.

BACKGROUND OF THE INVENTION

1. Field of the Invention

The present invention relates to a method and apparatus for slow reverse playback, and more particularly, to a method and apparatus for normal reverse playback.

2. Description of the Related Art

Accompanying the introduction of High Definition (HD) broadcasting, digital television (TV) sets have rapidly become popular. More recently, additional functions have been introduced in digital TVs, and premium-class digital TV sets and Audio/Video (AV) devices with high image quality have been introduced in the market. Moreover, during the same time, demand for a Personal Video Recording (PVR) function has increased, and TV sets employing the PVR function are available. The PVR function has a trick mode and a time shift function.

The PVR trick mode includes a slow reverse playback mode. A trick mode decoding apparatus for the slow reverse playback mode is disclosed in Korean Patent Publication No. 10-0335060. FIG. 1 is a block diagram of the trick mode decoding apparatus disclosed in the related art. Referring to FIG. 1, the trick mode decoding apparatus includes a Digital Storage Medium (DSM) 101, such as a Compact Disc Read Only Memory (CD-ROM), a Digital Audio Tape (DAT), or a Digital Versatile Disc (DVD), a video decoder 102 for Moving Picture Experts Group (MPEG) decoding, and a memory 103 storing image data for display. The DSM 101 repeatedly transmits an MPEG bitstream corresponding to a single Group Of Pictures (GOP) to the video decoder 102. The memory 103 has the capacity to store pictures corresponding to three frames.

FIG. 2 is a conceptual diagram for describing the slow reverse playback mode of the apparatus illustrated in FIG. 1. If slow reverse playback starts in the apparatus illustrated in FIG. 1, the DSM 101 repeatedly provides the same GOP to the video decoder 102 a number of times, corresponding to the number of pictures that must be displayed. For instance, if the slow reverse playback mode begins when an $M^{th}$ picture of a GOP(0) is displayed, the DSM 101 repeatedly transmits a bitstream of the GOP(0) to the video decoder 102 (M−1) times. More particularly, when the bitstream of the GOP(0) is transmitted to the video decoder 102 for the first time after the slow reverse playback mode begins, the video decoder 102 can decode first to $(M-1)^{th}$ pictures of the GOP(0). Next, when the bitstream of the GOP(0) is transmitted to the video decoder 102 for the second time, the video decoder 102 can decode first to $(M-2)^{th}$ pictures of the GOP(0). Here, M and (M−1) denote the order of pictures of the GOP(0) in a forward play mode. In this manner, the video decoder 102 decodes the bitstream of the GOP(0) (M−1) times and decodes a bitstream of a GOP(−1) from an $N^{th}$ picture. According to the MPEG standard, an I picture denotes an intra coded picture, a P picture denotes a predictive coded picture, and a B picture denotes a bidirectionally-predictive coded picture. In this case, the video decoder 102 decodes only reference pictures including I and P pictures and a picture to be displayed next. A decoding operation of the video decoder 102 will now be described in more detail with reference to FIG. 3.

FIG. 3 illustrates a stream order and a display order of pictures of a single GOP. In FIG. 3, the display order indicates the order in which I, P, and B pictures are displayed on a screen, and the stream order indicates the order in which I, P, and B pictures are included in a bitstream. $B0^+$, $B1^+$, and $I2^+$ pictures having a superscript "+" indicate pictures of a GOP (X+1). It is assumed in FIG. 3 that each GOP is comprised of 9 pictures. In each GOP, a number next to each capital I, P, or B indicates the display order of the corresponding pictures of the GOP. Thus, pictures of a GOP(X) are displayed in the order of B0, B1, I2, B3, B4, P5, B6, B7, and P8 in the case of forward playback. In the bitstream, the pictures of the GOP (X) are included in the order of I2, B0, B1, P5, B3, B4, P8, B6, and B7.

In the slow reverse playback mode, the pictures of the GOP(X) illustrated in FIG. 3 must be displayed in the order of P8, B7, B6, P5, B4, B3, I2, B1, and B0. Meanwhile, according to the MPEG standard, a P picture needs an I or P picture as a reference picture, and a B picture needs an I picture and/or a P picture as reference pictures. Thus, in order to decode a P or B picture located at the end of a stream order among the pictures in a GOP, reference picture(s) for the P or B picture must be decoded first. As described above, the memory 103 illustrated in FIG. 1 has the capacity to store 3 pictures. Thus, if the $M^{th}$ picture being displayed when switching to reverse playback is the picture B7 of the GOP(X) illustrated in FIG. 3, the video decoder 102 obtains only the pictures I2, P5, P8, and B6 by decoding the bitstream received from the DSM 101. That is, the video decoder 102 skips the pictures B0, B1, B3, and B4 of the received encoded pictures without decoding.

If a picture B7 is currently displayed, after the memory 103 stores data of the pictures I2, P5, and P8, the data of the picture I2 is deleted from the memory 103 in order to prepare the space for storing data of the picture B6. The picture B6 is decoded using the data of the decoded pictures P5 and P8 stored in the memory 103, and the decoded picture B6 is stored in the memory 103. The decoded picture B6 stored in the memory 103 is transmitted for display. While the picture B6 is repeatedly displayed, the video decoder 102 decodes the bitstream of the GOP(X) received from the DSM 101 and stores the decoded pictures I2 and P5 in the memory 103. The picture P5 stored in the memory 103 is displayed. While the picture P5 is displayed, the video decoder 102 obtains the decoded pictures I2 and P5 by decoding the bitstream of the GOP(X) received from the DSM 101 and obtains the decoded picture B4 using the decoded pictures I2 and P5. While the picture B4 is displayed, the DSM 101 transmits the bitstream of the GOP(X) to the video decoder 102, and the video decoder 102 decodes the bitstream of the GOP(X) in order to obtain the reference pictures I2 and P5 and the picture B3. In this manner, the pictures are displayed on a display block (not shown) in the order of B7, B6, P5, B4, B3, I2, B1, and B0.

However, when the apparatus illustrated in FIG. 1 performs slow reverse playback, it must repeatedly decode a bitstream until a picture is displayed. For example, in order to display the picture B7 or B6, the three reference pictures I2, P5, and P8 and the subject picture B7 or B6 must be decoded. In another case, in order to display the picture B3 or B4, the two reference pictures I2 and P5 and the subject picture B3 or B4 must be decoded. Thus, as the speed of slow reverse playback approaches normal speed, i.e., 1× speed, the time required to decode the bitstream as set forth above becomes insufficient.

As a result, the apparatus illustrated in FIG. 1 cannot implement normal (1×) reverse playback.

Furthermore, the apparatus illustrated in FIG. 1 repeatedly decodes reference pictures (I and P pictures) from a first picture of each GOP by using the memory 103, which can store three image frames. Thus, as more reference pictures are included in a GOP, more time is needed for decoding pictures to be displayed. Consequently, the decoding performance of an MPEG decoder must be excellent when the number of pictures in a GOP increases.

In order to solve this problem, a memory buffer used to store all the pictures included in a GOP may be implemented in a video decoder. However, this configuration would use memory inefficiently, since only reference pictures I and P are needed to decode each B picture.

SUMMARY OF THE INVENTION

The present invention provides a reverse playback method to smoothly display all pictures without repeating any picture.

The present invention also provides a reverse playback apparatus for implementing the reverse playback method.

According to an aspect of the present invention, there is provided a method for normal reverse playback from an $X^{th}$ Group Of Pictures (GOP) of GOPs of a bitstream, the method comprising: (A) decoding all reference pictures in the $X^{th}$ GOP; (B) decoding a first reference picture in a stream order in an $(X-1)^{th}$ GOP; and (C) sequentially designating each picture from a first picture in a reverse display order in the $X^{th}$ GOP as an nth picture having a reverse display order number n and simultaneously performing: (a) if the nth picture having the reverse display order number n is a reference picture or a B picture and an (n+1)th picture having a reverse display order number (n+1) is the B picture, decoding the (n+1)th picture having the reverse display order number (n+1) in the $X^{th}$ GOP; (b) if the nth picture having the reverse display order number n is the B picture and the (n+1)th picture having the reverse display order number (n+1) is the reference picture, decoding the first reference picture in the stream order among undecoded reference pictures in the $(X-1)^{th}$ GOP; and (c) if the nth picture having the reverse display order number n is a first picture in a forward display order in the $X^{th}$ GOP, decoding another first reference picture in a stream order in an $(X-2)^{th}$ GOP.

According to another aspect of the present invention, there is provided an apparatus for normal reverse playback from an $X^{th}$ Group Of Pictures (GOP) of GOPs of a generated bitstream stored in a storage medium, the apparatus comprising: an MPEG decoder which reads a first bitstream corresponding to an $X^{th}$ GOP and an $(X-1)^{th}$ GOP from the storage medium and which decodes pictures of the $X^{th}$ GOP and reference pictures of the $(X-1)^{th}$ GOP using the read first bitstream; a frame buffer which stores the pictures decoded by the MPEG decoder; and a display block which displays the decoded pictures stored in the frame buffer, wherein in the normal reverse playback, the apparatus displays all the decoded pictures only once, and each display time of the decoded pictures displayed only once is the same.

BRIEF DESCRIPTION OF THE DRAWINGS

The above and other features and advantages of the present invention will become more apparent by describing in detail exemplary embodiments thereof with reference to the attached drawings in which:

FIGS. 6(a)-6(e), 7(a)-7(f), and 8(a)-8(i) are diagrams for describing GOP decoding for normal reverse playback according to an exemplary embodiment of the present invention.

DETAILED DESCRIPTION OF THE INVENTION

Figure 4:
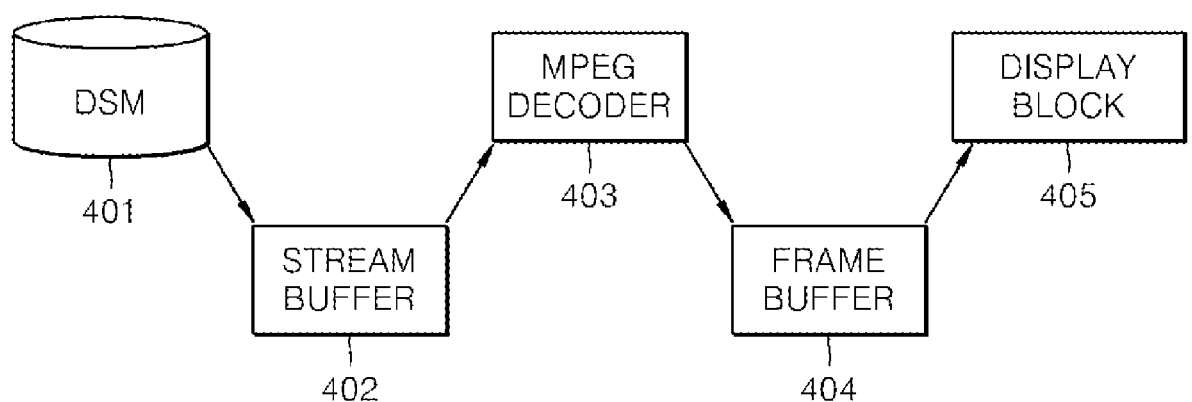
FIG. 4 is a block diagram of a playback apparatus according to an exemplary embodiment of the present invention.

FIG. 4 is a block diagram of an apparatus for normal reverse playback according to an exemplary embodiment of the present invention. Referring to FIG. 4, the apparatus includes a Digital Storage Medium (DSM) 401, a stream buffer 402, an MPEG decoder 403, a frame buffer 404, and a display block 405.

The DSM 401 provides an MPEG bitstream to the stream buffer 402. The stream buffer 402 can store the MPEG bitstream stored in the DSM 401. The MPEG decoder 403 generates data of decoded pictures by decoding the bitstream stored in the stream buffer 402. The data of the decoded pictures is stored in the frame buffer 404. In the current exemplary embodiment, the frame buffer 404 has a memory size sufficient to store 6 decoded pictures. The display block 405 displays the decoded picture data stored in the frame buffer 404 on a screen (not shown).

Figure 5:
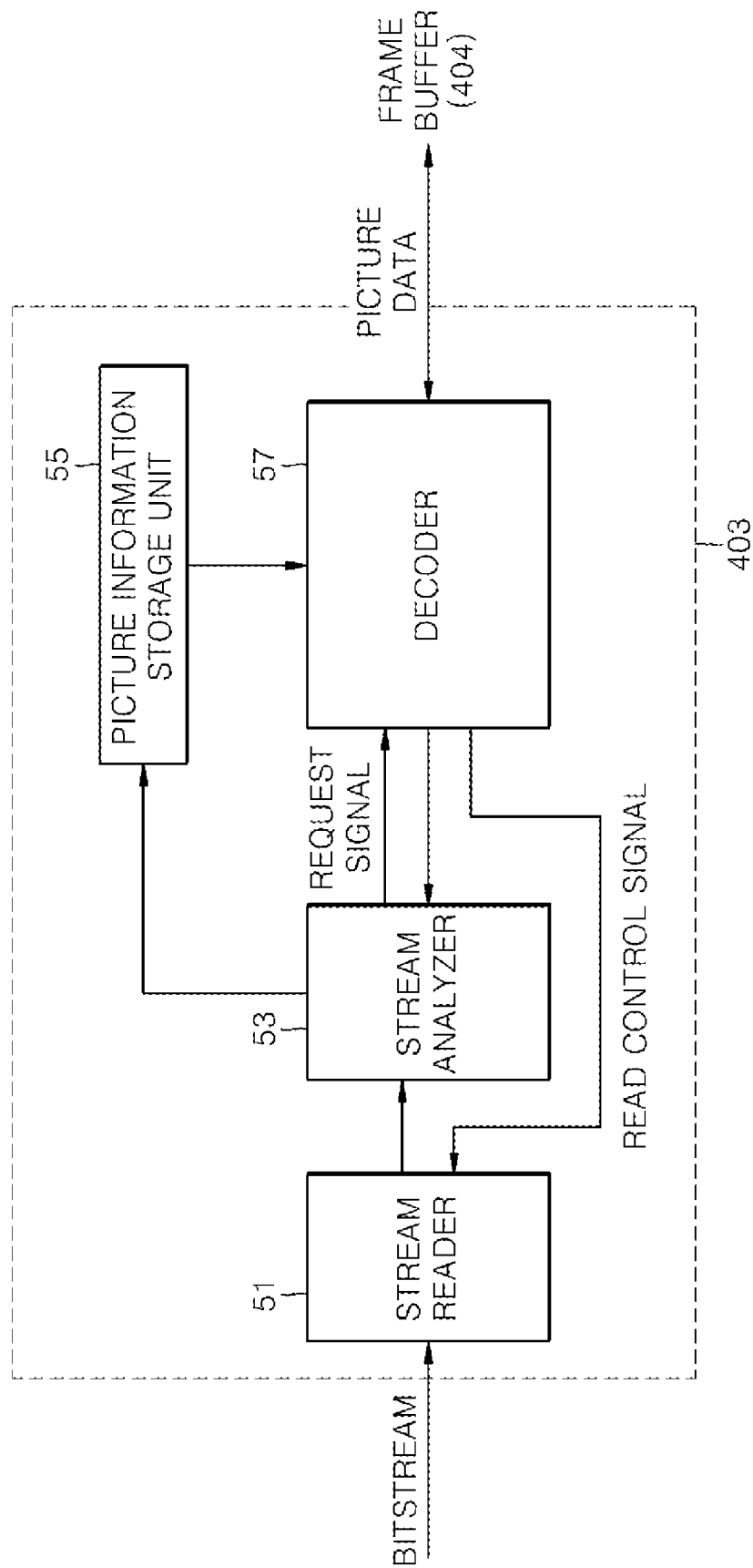
FIG. 5 is a block diagram of an MPEG decoder illustrated in FIG. 4, according to the exemplary embodiment of the present invention.

FIG. 5 is a block diagram of the MPEG decoder 403 illustrated in FIG. 4, according to the exemplary embodiment of the present invention. Referring to FIG. 5, the MPEG decoder 403 includes a stream reader 51, a stream analyzer 53, a picture information storage unit 55, and a decoder 57.

The stream reader 51 reads the bitstream stored in the stream buffer 402 based on a read control signal received from the decoder 57. The stream buffer 402 can have storage capacity sufficient to store a bitstream corresponding to two pictures coming after the picture currently read by the MPEG decoder 403. Alternatively, the stream reader 51 can read a bitstream directly from the DSM 401 based on the read control signal instead of using the stream buffer 402. The stream analyzer 53 extracts picture information by analyzing the read bitstream. The extracted picture information includes a GOP structure, the number of pictures forming each GOP, and a display order number of each picture in the GOP. This picture information is stored in the picture information storage unit 55. The stream analyzer 53 transmits the bitstream from which the picture information has been extracted to the decoder 57 in response to a request signal received from the decoder 57. The GOP structure may be IBB(PBB)$^m$. Here, m is a natural number. Examples of the structure of IBB(PBB)$^m$ are a structure of IBBPBBPBB and a structure of IBBPBBPBBPBBPBB.

The bitstream transmitted from the stream analyzer 53 to the decoder 57 may include "picture coding type" data indicating whether each picture is an I picture, a P picture, or a B picture. In this case, the GOP structure and pictures forming a GOP can be obtained based on the picture coding type of each of the pictures of the GOP and the number of pictures forming the GOP stored in the picture information storage unit 55. Thus, the bitstream transmitted from the stream analyzer 53 to the decoder 57 may not include a GOP header.

Figure 1:
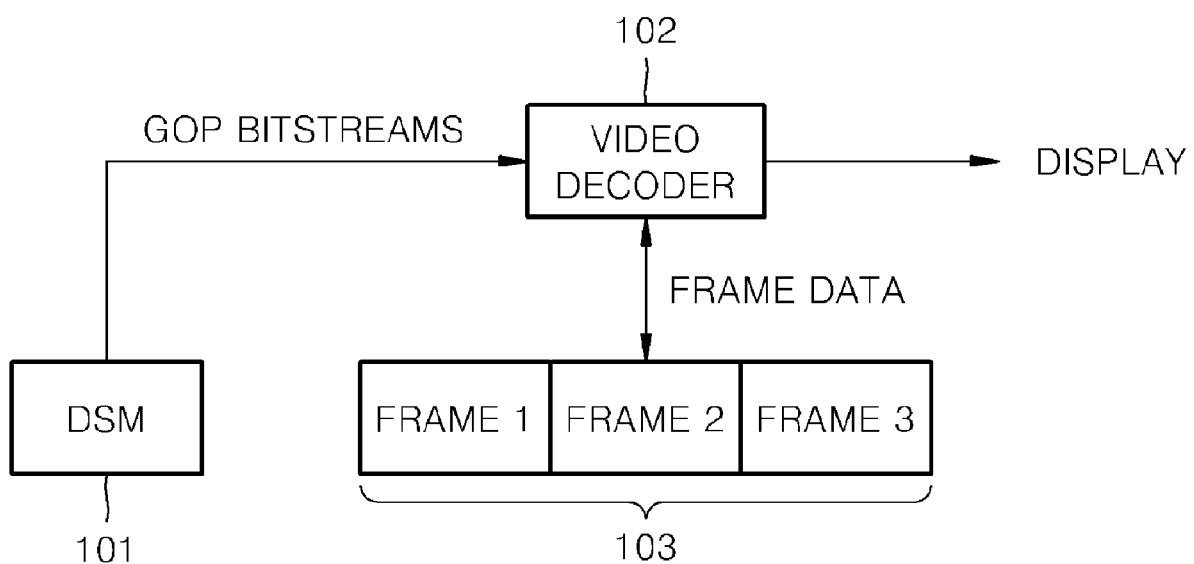
FIG. 1 is a block diagram of a trick mode decoding apparatus according to the related art.
Figure 2:
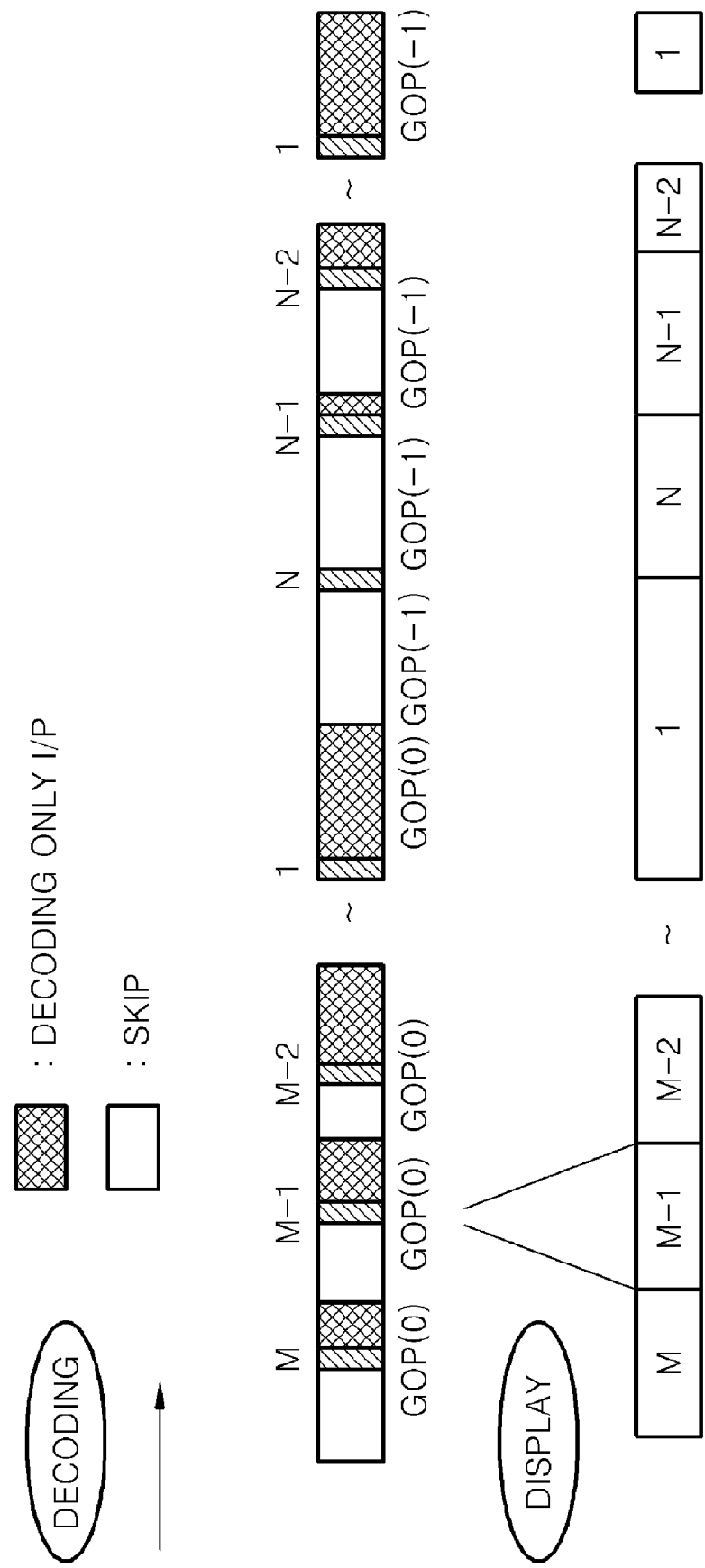
FIG. 2 is a diagram for describing repeated use of a Group Of Pictures (GOP) related to the operation of the apparatus illustrated in FIG. 1.
Figure 3:
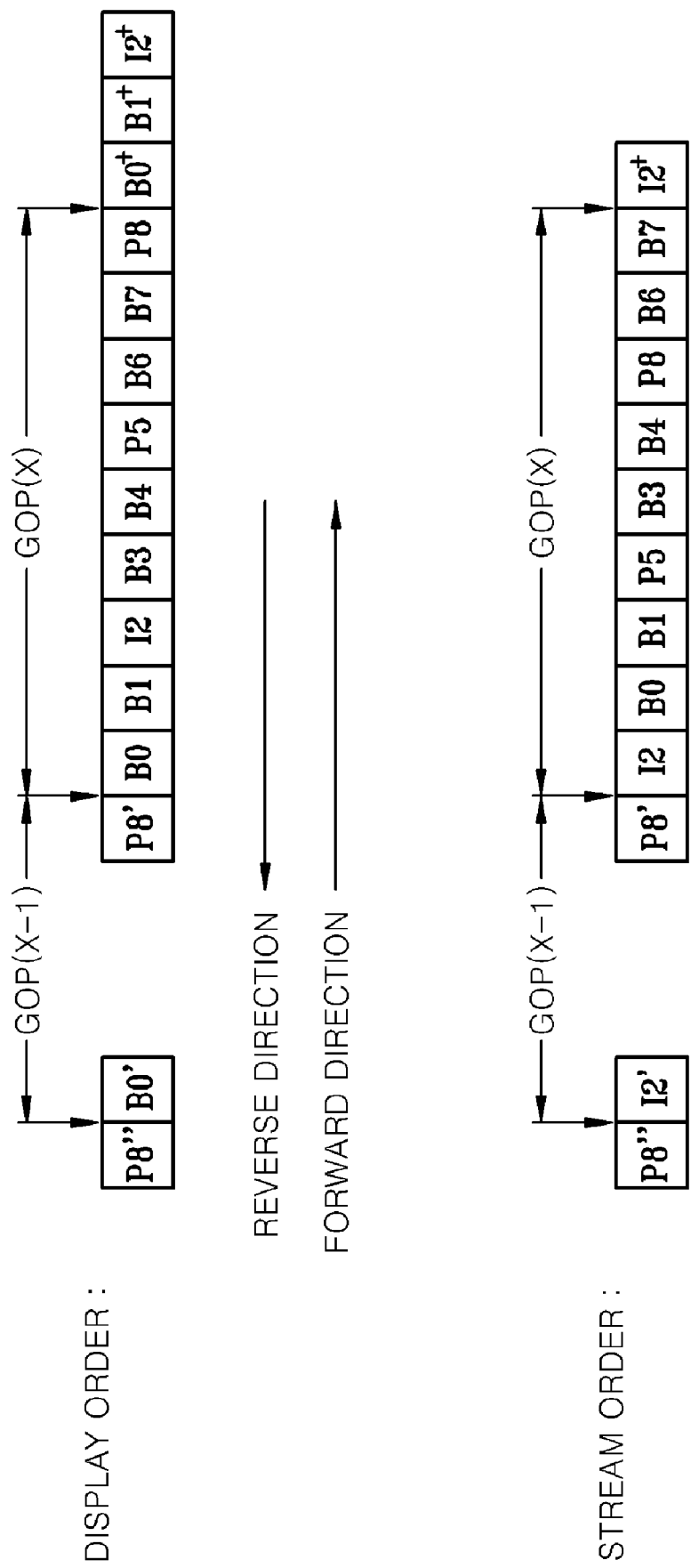
FIG. 3 illustrates a GOP display order and a GOP stream order of a Moving Picture Experts Group (MPEG) bitstream.

As noted above, the decoder 57 transmits the read control signal to the stream reader 51 and transmits the request signal to the stream analyzer 53. In normal forward playback, the read control signal is used to read the bitstream stored in the stream buffer 402 in the same order as stored in the stream buffer 402. In normal reverse playback, the read control signal is used to alternately read two adjacent GOPs in the bitstream stored in the stream buffer 402. The request signal is used to obtain a bitstream of a picture to be decoded by the decoder 57 from among the bitstream stored in the stream buffer 402. In forward or reverse playback at speeds other than normal speed, technology well known to those in the art related to the trick mode, e.g., the related art described in FIG. 1, can be used unchanged, and thus will not be described here in detail.

Figure 6:
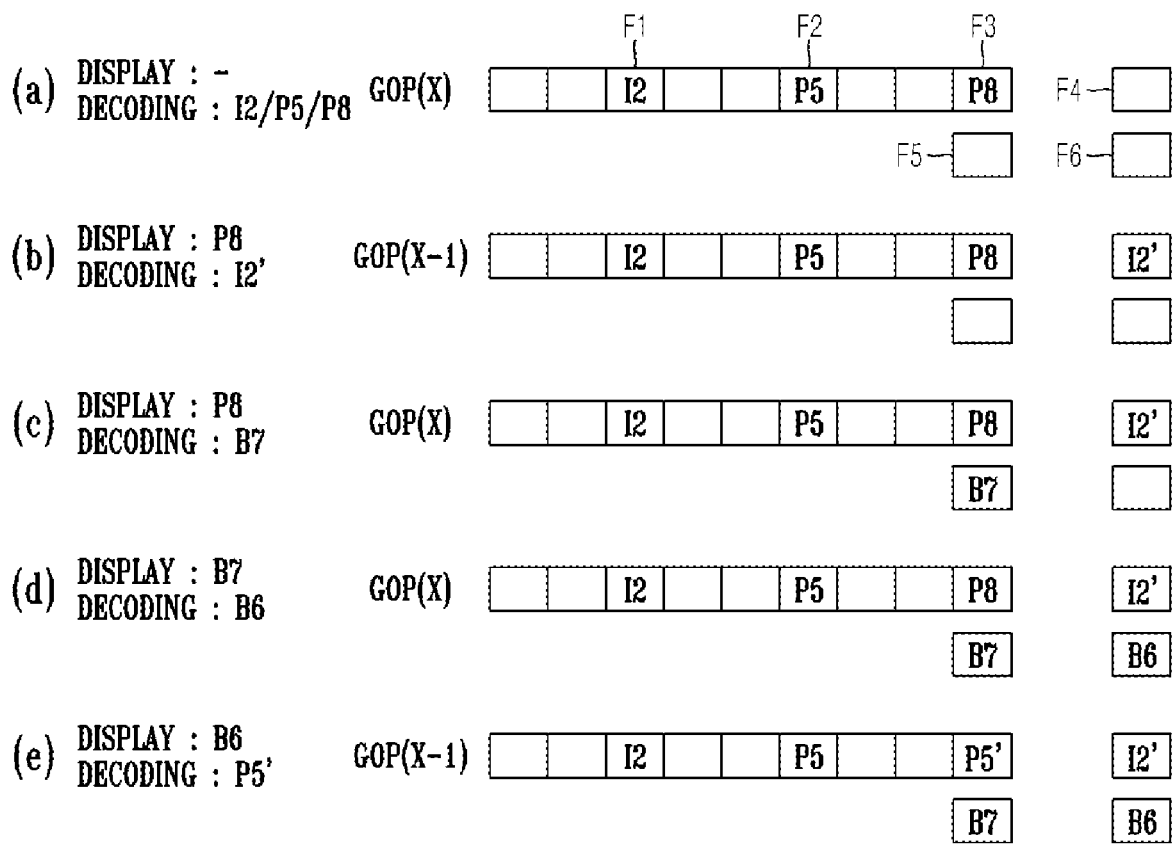

Hereinafter, it is assumed for convenience of description that the frame buffer 404 includes 6 frame memories. The 6 frame memories are shown in FIG. 6(a) using reference numerals F1 through F6. In FIGS. 6(b)-6(e), 7(a)-7(f), and 8(a)-8(i), the reference numerals for the 6 frame memories are omitted for simplicity.

If the apparatus illustrated in FIG. 4 operates in a forward playback mode, the MPEG decoder 403 reads a bitstream stored in the stream buffer 402 and decodes encoded pictures of each GOP in a display order. For example, if the structure of a single GOP is 'IBBPBBPBB', the decoder 57 decodes the pictures in the order of I2, B0, B1, P5, B3, B4, P8, B6, and B7. The decoded pictures are stored in the frame memories F1 through F6 in the decoded order and displayed by means of the display block 405 in the order of B0, B1, I2, B3, B4, P5, B6, B7, and P8.

The decoder 57 can generate display picture designation information indicating what picture is designated as a display picture. The display picture designation information can be provided as a pointer to a frame memory in which data of a picture selected as the display picture is stored. Alternatively, a flag for distinguishing a frame memory in which the display picture is stored can be used to designate the display picture. The display block 405 can be configured to actively read picture data stored in the frame buffer 404. In this case, the display picture designation information can be provided from the decoder 57 to the display block 405. Alternatively, the frame buffer 404 can determine a frame memory for the display picture based on the display picture designation information and provide picture data stored in the frame memory to the display block 405. If a user can select a picture in the beginning of reverse playback by means of a user interface, the apparatus illustrated in FIG. 4 can begin the reverse playback by means of the display block 405 from when the picture selected by the user is matched up with its display picture designation information. Alternatively, the apparatus illustrated in FIG. 4 can begin the normal reverse playback from the first picture in the reverse display order of a GOP to which the picture selected by the user belongs. For example, if the GOP structure is 'IBBPBBPBB', the apparatus illustrated in FIG. 4 can begin the normal reverse playback from a picture P8.

The number of pictures in each GOP can vary according to a video sequence level. In other words, each GOP may include 9 pictures in a certain video sequence, and further include more than 9 pictures (e.g. 15 pictures) in another video sequence. If the apparatus illustrated in FIG. 4 operates in a normal reverse playback mode, in order to decode all the pictures in a GOP, a frame buffer size must be determined based on the number of pictures forming the GOP. However, because of hardware limitations, it may be difficult to change the storage capacity of the frame buffer 404 to fit the number of pictures forming the GOP. In this case, the storage capacity of the frame buffer 404 may be fixed to a constant value, and it may be determined based on a comparison result between the storage capacity of the frame buffer 404 and the number of pictures forming the GOP whether the normal reverse playback according to the exemplary embodiment of the present invention is applied.

If the frame buffer 404 has a storage capacity sufficient to store the pictures corresponding to a number obtained by adding the number of reference pictures of a GOP, the number of B pictures between the two adjacent reference pictures, and 1, then a bitstream of adjacent B pictures in a GOP(X) can be read only once for the normal reverse playback. For example, if the frame buffer 404 has 6 frame memories, pictures B7 and B6 can be decoded using the bitstream read only once, and pictures B4 and B3 also can be decoded using the bitstream read only once. Pictures B1 and B0 also can be decoded using the bitstream read only once. In this case, while the pictures of the GOP(X) are designated as display pictures, the bitstream of the GOP(X) and a bitstream of a GOP(X−1) can be alternately read from the stream buffer 402. As an option, every time each B picture is decoded, a bitstream having the B picture can be read from the stream buffer 402. Meanwhile, if the frame buffer 404 has a storage capacity sufficient to store the pictures corresponding to a number obtained by adding the number of reference pictures of a GOP and 2, if the pictures of the GOP(X) are designated as display pictures, then a bitstream must be read from the stream buffer 402 every time a B picture of the GOP(X) is decoded. For example, if the frame buffer 404 has 5 frame memories, in order to decode each of the pictures B7, B6, B4, B3, B1, and B0, every time each B picture is decoded, a corresponding bitstream must be read from the stream buffer 402.

According to the exemplary embodiment of the present invention, the frame buffer 404 has storage capacity sufficient to store 6 picture frames. Thus, if each GOP has a GOP structure of 'IBBPBBPBB', when normal reverse playback is performed for a bitstream having GOPs and each GOP is comprised of a total of 9 pictures, then the apparatus illustrated in FIG. 4 can display every picture of each GOP without repeating or skipping. If each GOP has a GOP structure of 'IBBPBBPBBPBBPBB', i.e. if each GOP is comprised of a total of 15 pictures, the apparatus illustrated in FIG. 4 performs the normal reverse playback while properly repeating and skipping some pictures to linearly display pictures. The expression "linearly display" means that all displayed pictures are displayed for the same duration and the same number of times. Thus, when the normal reverse playback is performed, the apparatus illustrated in FIG. 4 displays all pictures only once and for the same duration.

If an operation mode of the apparatus illustrated in FIG. 4 is changed to the normal reverse playback mode, the decoder 57 reads picture information stored in the picture information storage unit 55 and compares the number of pictures of the GOP(X) to the number of pictures that the frame buffer 404 has a capacity to store. As described above, the number of pictures of the GOP(X) is acquired by the stream analyzer 53 and stored in the picture information storage unit 55 in advance. The MPEG decoder 403 reads the bitstream of the GOP(X) from the stream buffer 402. The decoder 57 generates the read control signal used to read the bitstream of the GOP(X) and generates the request signal used to request I and P pictures of the GOP(X). The stream reader 51 reads the bitstream of the GOP(X) from the stream buffer 402 in response to the read control signal. The stream analyzer 53 determines the picture coding type of each picture contained in the bitstream, and provides picture information to the picture information storage unit 55. The picture information contains "GOP structure", "number of pictures" forming each GOP, and "display order number" of each picture in the GOP. The stream analyzer 53 also transmits the I and P pictures to the decoder 57 in response to the request signal. The decoder 57 determines the GOP structure and the number of pictures of each corresponding GOP based on the picture information stored in the picture information storage unit 55, and thereby determines whether a decoding operation for linear normal reverse playback according to the exemplary embodiment of the present invention is performed using the frame buffer 404. If it is determined that the linear normal reverse playback can be performed, the linear normal reverse playback is performed as described with reference to FIGS. 6(a)-6(e), 7(a)-7(f), and 8(a)-8(i).

A decoding operation for the linear normal reverse playback performed by the decoder 57 will now be described in detail with reference to FIGS. 6(a)-6(e), 7(a)-7(f), and 8(a)-8(i).

Figure 7:
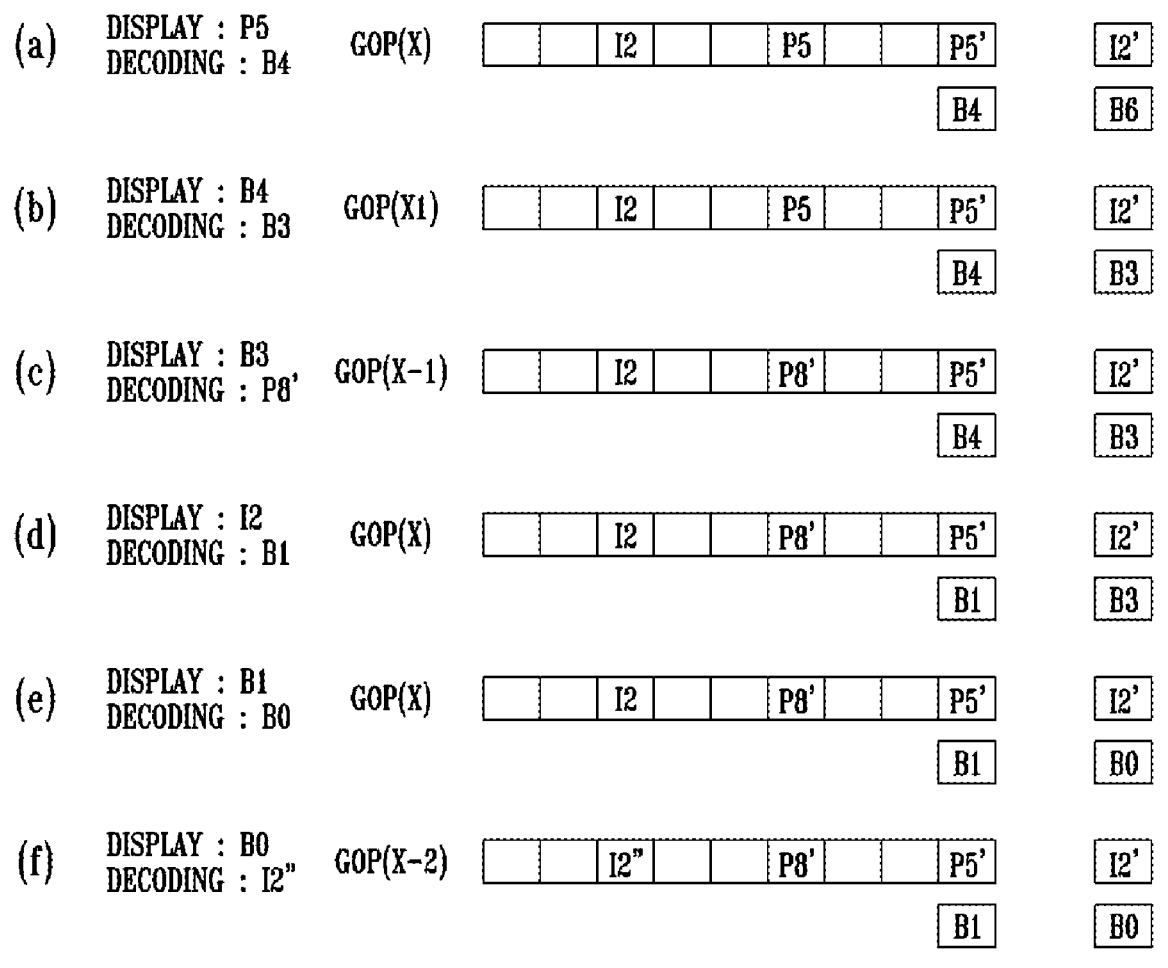

The decoder 57 decodes the pictures I2, P5, and P8 of the GOP(X) and stores the decoded pictures I2, P5, and P8 in the frame memories F1 through F3 as illustrated in FIG. 6(a). In this case, there is no picture designated as a display picture. The decoder 57 designates the decoded picture P8 as a display picture. While the decoded picture P8 is designated as a display picture, the MPEG decoder 403 reads the bitstream of the GOP(X−1) from the stream buffer 402, and the decoder 57 decodes a picture I2', which is a first reference picture of the GOP(X−1). The decoded picture I2' is stored in the frame memory F4 as illustrated in FIG. 6(b). While the decoded picture P8 of the GOP(X) is designated as a display picture, the picture B7 of the GOP(X) is decoded using the reference pictures P5 and P8. The decoded picture B7 is stored in the frame memory F5 as illustrated in FIG. 6(c). The decoded picture B7 of the GOP(X) is designated as a display picture, and while the decoded picture B7 of the GOP(X) is designated as a display picture, the picture B6 of the GOP(X) is decoded using the reference pictures P5 and P8. The decoded picture B6 is stored in the frame memory F6 as illustrated in FIG. 6(d). The decoded picture B6 of the GOP(X) is designated as a display picture, and while the decoded picture B6 of the GOP(X) is designated as a display picture, a picture P5' of the GOP(X−1) is decoded using the picture I2'. The decoded picture P5' is stored in the frame memory F3 as illustrated in FIG. 6(e). The decoded picture P5 of the GOP (X) is designated as a display picture, and while the decoded picture P5 of the GOP(X) is designated as a display picture, the picture B4 of the GOP(X) is decoded using the pictures I2 and P5. The decoded picture B4 is stored in the frame memory F5 as illustrated in FIG. 7(a). The decoded picture B4 of the GOP(X) is designated as a display picture, and while the decoded picture B4 of the GOP(X) is designated as a display picture, the picture B3 of the GOP(X) is decoded using the pictures I2 and P5. The decoded picture B3 is stored in the frame memory F6 as illustrated in FIG. 7(b). The decoded picture B3 of the GOP(X) is designated as a display picture, and while the decoded picture B3 of the GOP(X) is designated as a display picture, a picture P8' of the GOP(X−1) is decoded using the picture P5'. The decoded picture P8' is stored in the frame memory F2 as illustrated in FIG. 7(c). Next, the decoded picture I2 of the GOP(X) is designated as a display picture, and while the decoded picture I2 of the GOP(X) is designated as a display picture, the picture B1 of the GOP(X) is decoded using the pictures I2 and P8'. The decoded picture B1 is stored in the frame memory F5 as illustrated in FIG. 7(d). The decoded picture B1 of the GOP (X) is designated as a display picture, and while the decoded picture B1 of the GOP(X) is designated as a display picture, the picture B0 of the GOP(X) is decoded using the pictures I2 and P8'. The decoded picture B0 is stored in the frame memory F6 as illustrated in FIG. 7(e). The decoded picture B0 is designated as a display picture, and while the decoded picture B0 of the GOP(X) is designated as a display picture, a picture I2" of a GOP(X−2) is decoded. The decoded picture I2" is stored in the frame memory F1 as illustrated in FIG. 7(f).

Next, after the decoded picture P8' is designated as a display picture, the same procedures as those illustrated in FIGS. 6(c)-6(e) and 7(a)-7(f) are repeatedly performed. The operation of the MPEG decoder 403 associated with FIGS. 8(a)-8(i) is similar to the operation of the MPEG decoder 403 associated with FIGS. 6(c)-6(e) and 7(a)-7(f).

Although it has been described that the frame buffer 404 has 6 frame memories, this exemplary storage capacity of the frame buffer 404 does not limit the present invention, i.e., the storage capacity of the frame buffer may have less than or more than 6 frame memories. If a portion of a general-use memory employed in the apparatus is used to store pictures decoded by the MPEG decoder 403, a memory area having a storage capacity sufficient to store pictures corresponding to a number obtained by adding the number of reference pictures of a GOP, the number of B pictures between the two adjacent reference pictures, and 1 can be used instead of the frame buffer 404.

As described above, according to an aspect of the present invention, when normal reverse playback is performed, pictures of each GOP can be decoded without skipping, and the same picture can be displayed only once. Thus, linear playback can be achieved, to provide a natural moving picture, even during the normal reverse playback. Thus, a user using a PVR function can perform a linear search for every speed during reverse playback.

In addition, an MPEG decoder reads a GOP bitstream from a storage medium only when, and as much as, necessary, thereby reducing the complexity of control. In addition, during normal reverse playback, the frame buffer needs only a storage capacity sufficient to store pictures corresponding to a number obtained by adding the number of reference pictures of a GOP, the number of B pictures between the two adjacent reference pictures, and 1. Thus, in order to achieve linear normal reverse playback, the storage capacity of the frame buffer does not have to be large.

In addition, if the number of pictures forming a GOP varies according to the sequence, by using a GOP structure and the number of pictures forming each GOP, which are obtained by means of stream analysis, a memory area having a storage capacity suitable for each sequence can be used as the frame buffer. Thus, the linear normal reverse playback can be achieved for different sequences having a different number of pictures in each GOP.

While the present invention has been particularly shown and described with reference to exemplary embodiments thereof, it will be understood by those of ordinary skill in the art that various changes in form and detail may be made therein without departing from the spirit and scope of the invention as defined by the appended claims. The preferred embodiments should be considered in a descriptive sense only, and not for purposes of limitation. Therefore, the scope of the invention is defined not by the detailed description of the invention but by the appended claims, and all differences within the scope will be construed as being included in the present invention.

What is claimed is:

1. A method for normal reverse playback from an $X^{th}$ Group Of Pictures (GOP) of GOPs of a bitstream, the method comprising:
    decoding all reference pictures in the Xth GOP;
    decoding a first reference picture in a stream order in an (X−1)th GOP; and
    sequentially designating each picture from a first picture in a reverse display order in the Xth GOP as an nth picture having a reverse display order number n and when the nth picture having the reverse display order number n is designated as a display picture, performing:
        if the nth picture having the reverse display order number n is a reference picture or a B picture and an (n+1)th picture having a reverse display order number (n+1) is a B picture, decoding the (n+1)th picture having the reverse display order number (n+1) in the Xth GOP;
        if the nth picture having the reverse display order number n is the B picture and the (n+1)th picture having the reverse display order number (n+1) is a reference picture, decoding a next reference picture in the stream order among undecoded reference pictures in the (X−1)th GOP; and
        if the nth picture having the reverse display order number n is a first picture in a forward display order in the Xth GOP, decoding another first reference picture in a stream order in an (X−2)th GOP.

2. The method of claim 1, wherein the reference pictures comprise an I picture and a P picture.

3. The method of claim 2, wherein a structure of the GOP is IBB(PBB)$^m$, wherein m is a natural number.

4. The method of claim 3, further comprising:
    beginning the normal reverse playback from when the nth picture having the reverse display order number n meets a selected picture that is selected by a user for the normal reverse playback.

5. The method of claim 3, further comprising:
    beginning the normal reverse playback from the first picture in the reverse display order of the Xth GOP to which a selected picture that is selected by a user belongs.

6. The method of claim 3, further comprising:
    determining a number of pictures forming each GOP based on header information of a bitstream of the GOPs;
    determining a storage capacity of a memory area for storing decoded pictures based on the number of pictures forming the each GOP; and
    storing the decoded pictures in the memory area.

7. An apparatus for performing normal reverse playback from an Xth Group Of Pictures (GOP) of GOPs of a generated bitstream stored in a storage medium, the apparatus comprising:
    an MPEG decoder which reads a first bitstream corresponding to an Xth GOP and an (X−1)th GOP from the storage medium and which decodes pictures of the Xth GOP and reference pictures of the (X−1)th GOP using the read first bitstream;
    a frame buffer which stores the pictures decoded by the MPEG decoder; and
    a display block which displays the decoded pictures stored in the frame buffer,
    wherein during the normal reverse playback, the apparatus displays all the decoded pictures only once, and each display time of the decoded pictures displayed only once is the same,
    wherein the MPEG decoder decodes all reference pictures in the Xth GOP; decodes a first reference picture in a stream order in the (X−1)th GOP; and sequentially designates each picture from a first picture in a reverse display order in the Xth GOP as an nth picture having a reverse display order number n and when the nth picture having the reverse display order number n is designated as a display picture, performs the following:
        if the nth picture having the reverse display order number n is a reference picture or a B picture and an (n+1)th picture having a reverse display order number (n+1) is a B picture, decoding the (n+1)th picture having the reverse display order number (n+1) in the Xth GOP:
        if the nth picture having the reverse display order number n is the B picture and the (n+1)th picture having the reverse display order number (n+1) is a reference picture, decoding a next reference picture in the stream order among undecoded reference pictures in the (X−1)th GOP; and
        if the nth picture having the reverse display order number n is a first picture in a forward display order in the Xth GOP, decoding another first reference picture in a stream order in an (X−2)th GOP.

8. The apparatus of claim 7, further comprising:
    a stream buffer which stores the first bitstream read from the storage medium,
    wherein the MPEG decoder decodes the pictures of the Xth GOP and the reference pictures of the (X−1)th GOP using the first bitstream of the Xth GOP and the (X−1)th GOP stored in the stream buffer.

9. The apparatus of claim 7, wherein the MPEG decoder comprises:
    a stream reader which reads a bitstream of two consecutive GOPs from the storage medium and which alternately outputs the two GOPs of the read bitstream;
    a stream analyzer which extracts picture information by analyzing the GOPs output from the stream reader and which outputs the extracted picture information and a second bitstream;
    a picture information storage unit which stores the extracted picture information; and
    a decoder which generates decoded pictures by decoding the second bitstream output from the stream analyzer, based on the extracted picture information stored in the picture information storage unit.

10. The apparatus of claim 7, wherein a structure of the GOP is IBB(PBB)$^m$, wherein m is a natural number.

11. The apparatus of claim 10, wherein the frame buffer has a storage capacity sufficient to store pictures corresponding to a total number obtained by adding a first number indicating the number of reference pictures in a GOP, a second number indicating the number of B pictures between the two adjacent reference pictures in the GOP, and 1.

12. The apparatus of claim 9, wherein the apparatus begins the normal reverse playback from when the nth picture having the reverse display order number n meets a selected picture that is selected by a user for the normal reverse playback.

13. The apparatus of claim 10, wherein the apparatus begins the normal reverse playback from a first picture in the reverse display order of the Xth GOP to which a selected picture that is selected by a user belongs.

14. The apparatus of claim 9, wherein the decoder determines a number of pictures forming each GOP based on header information of a bitstream of the GOPs;
    determines a storage capacity of a memory area for storing decoded pictures based on the number of pictures forming each GOP; and stores the decoded pictures in the memory area.

15. A non-transitory computer readable recording medium storing a computer readable program for implementing functions of normal reverse playback from an Xth Group of Pictures (GOP) of GOPs of a bitstream, said functions comprising:
  decoding all reference pictures in the Xth GOP;
  decoding a first reference picture in a stream order in an (X−1)th GOP; and
  sequentially designating each picture from a first picture in a reverse display order in the Xth GOP as an nth picture having a reverse display order number n and when the nth picture having the reverse display order number n is designated as a display picture, performing:
  if the nth picture is a reference picture or a B picture and an (n+1)th picture having a reverse display order number (n+1) is a B picture, decoding the (n+1)th picture in the Xth GOP;
  if the nth picture is the B picture and the (n+1)th picture is a reference picture, decoding a next reference picture in the stream order among undecoded reference pictures in the (X−1)th GOP; and
  if the nth picture is a first picture in a forward display order in the Xth GOP, decoding another first reference picture in a stream order in an (X−2)th GOP.

16. The non-transitory computer readable recording medium according to claim 15, wherein the reference pictures comprise an I picture and a P picture.

17. The non-transitory computer readable recording medium according to claim 16, wherein a structure of the GOP is $IBB(PBB)^m$, wherein m is a natural number.

18. The non-transitory computer readable recording medium according to claim 17, further comprising:
  beginning the normal reverse playback from when the nth picture having the reverse display order number n meets a selected picture that is selected by a user for the normal reverse playback.

19. The non-transitory computer readable recording medium according to claim 17, further comprising:
  beginning the normal reverse playback from the first picture in the reverse display order of the Xth GOP to which a selected picture that is selected by a user belongs.

20. The non-transitory computer readable recording medium according to claim 17, further comprising:
  determining a number of pictures forming each GOP based on header information of a bitstream of the GOPs;
  determining a storage capacity of a memory area for storing decoded pictures based on the number of pictures forming each GOP; and
  storing the decoded pictures in the memory area.

* * * * *